United States Patent [19]
Wang et al.

[11] Patent Number: 5,229,938
[45] Date of Patent: * Jul. 20, 1993

[54] METHOD FOR MIGRATING SEISMIC DATA BY USING RAY TRACING IN DETERMINING TWO WAY TRAVEL TIMES

[75] Inventors: Shein-Shion Wang; John B. Sinton; Douglas W. Hanson, all of Ponca City, Okla.

[73] Assignee: Conoco Inc., Ponca City, Okla.

[*] Notice: The portion of the term of this patent subsequent to Apr. 17, 2007 has been disclaimed.

[21] Appl. No.: 373,355

[22] Filed: Jun. 28, 1989

[51] Int. Cl.⁵ .............................. G01V 1/00
[52] U.S. Cl. ........................ 364/421; 367/71
[58] Field of Search ............ 364/421; 367/71, 63, 367/59, 50, 68; 362/50

[56] References Cited

U.S. PATENT DOCUMENTS

| | | | |
|---|---|---|---|
| 3,638,178 | 1/1972 | Stephenson | 367/71 |
| 3,671,929 | 6/1972 | Ruehle et al. | 367/68 |
| 4,415,999 | 11/1983 | Moeckel et al. | 367/73 |
| 4,479,205 | 10/1984 | Gray | 367/63 |
| 4,611,312 | 9/1986 | Ikeda | 364/421 |
| 4,736,347 | 4/1988 | Goldberg et al. | 364/421 |
| 4,766,574 | 8/1988 | Whitmore, Jr. et al. | 364/421 |
| 4,888,742 | 12/1989 | Beasley | 367/50 |
| 4,918,670 | 4/1990 | Wang | 367/59 |
| 4,943,950 | 7/1990 | Beasley et al. | 367/50 |

Primary Examiner—Roy N. Envall, Jr.
Assistant Examiner—Xuong Chung

[57] ABSTRACT

A method for obtaining two way travel times for source and receiver pairs includes the steps of determining a set of one way travel times for each source to a plurality of image points and a set of one way travel times for each receiver to the plurality of image points. Ray sets are generated for both the sources and receivers. Travel times from a surface position to image points are computed by two point interpolation using the ray sets. Two way travel time is computed by summing two sets, one set each for the source and receiver positions. A two way travel time set is obtained for a particular source and receiver combination for all imaging points.

9 Claims, 4 Drawing Sheets

METHOD FOR MIGRATING SEISMIC DATA BY USING RAY TRACING IN DETERMINING TWO WAY TRAVEL TIMES

BACKGROUND OF THE INVENTION

1. Field of the Invention

The present invention pertains to determining two way travel times for seismic traces and more particularly, to determining two way travel times by first determining a one way travel time from a source position to all image points and then determining a one way travel time from to a receiver position to all image points.

2. Related Prior Art

Seismic data is used to obtain images of subsurface formations by generating seismic waves, transmitting them into the earth to a reflector or change in density interface and detecting their arrival at a receiver. This data is in the form of time maps (e.g. seismic section, seismic trace, seismic sample, and the like) which are arranged according to time; durations. The known factors are the source location, the receiver location and the time duration from generation to detection. The velocity of the seismic waves may be approximated by any one of the many methods presently in use. From these known quantities, the depth of the reflector is approximated by depth migration. Depth migration is the mapping of seismic traces on a depth scale, that is, migrating data from time to depth. This may be done either before or after mid point or common depth point (CDP) data is stacked or combined. One method for locating or identifying reflectors is by ray tracing from one point, such as the source location, to the reflector and back to a second point, such as a receiver location. Ray tracing in this manner is becoming extremely popular with the advent of high speed digital computers. However, two point ray tracing, from a source and back to a receiver, requires travel times for ray paths connecting a source position, all image points and a receiver position. This type of ray tracing requires that individual travel times be determined for each ray path from a source, to an image point and to a receiver for each image point at which the seismic wave generated at this source could be reflected and be detected at this receiver. Typically there are many hundreds of thousands of such image points. Thus, two point ray tracing is very time consuming and prohibitively expensive for computing the required travel times.

SUMMARY OF THE INVENTION

The present invention provides a method which derives a two way travel time from two sets of one way travel times. The first set is for ray paths connecting a source position and the image points, while the second set is for ray paths connecting a receiver position and the image points. One way travel times for both source and receiver sets are generated by the same procedure. First, a fan of rays is shot from the surface position (either source or receiver) to the imaging points using a constant ray angle spacing Additional rays are added to fill in regions of low ray density among the image points. This procedure of adding rays is repeated until the total ray set is evenly distributed over the image points These rays are stored according to their initial angles in a double linked list. Travel times from a surface position to the image points are computed by two point interpolation using the ray sets. Image points are evenly distributed in depth. Interpolation starts from the earliest imaging depth and ends at the latest imaging depth. Pairs of adjacent rays are used in the interpolation. One-way travel time is set to the maximum travel time for regions where the ray sets do not reach.

DESCRIPTION OF THE PREFERRED EMBODIMENT

The present invention provides a method which derives a two way travel time from two sets of one way travel times. The first set of ray paths is one connecting a source position and the image points, while the second set is one connecting a receiver position and the image points. These travel time sets can be generated economically from a fan of rays without using two-point ray tracing. The sets are stored on disk as they are generated for re-use with other source-receiver combinations.

Figure 1:
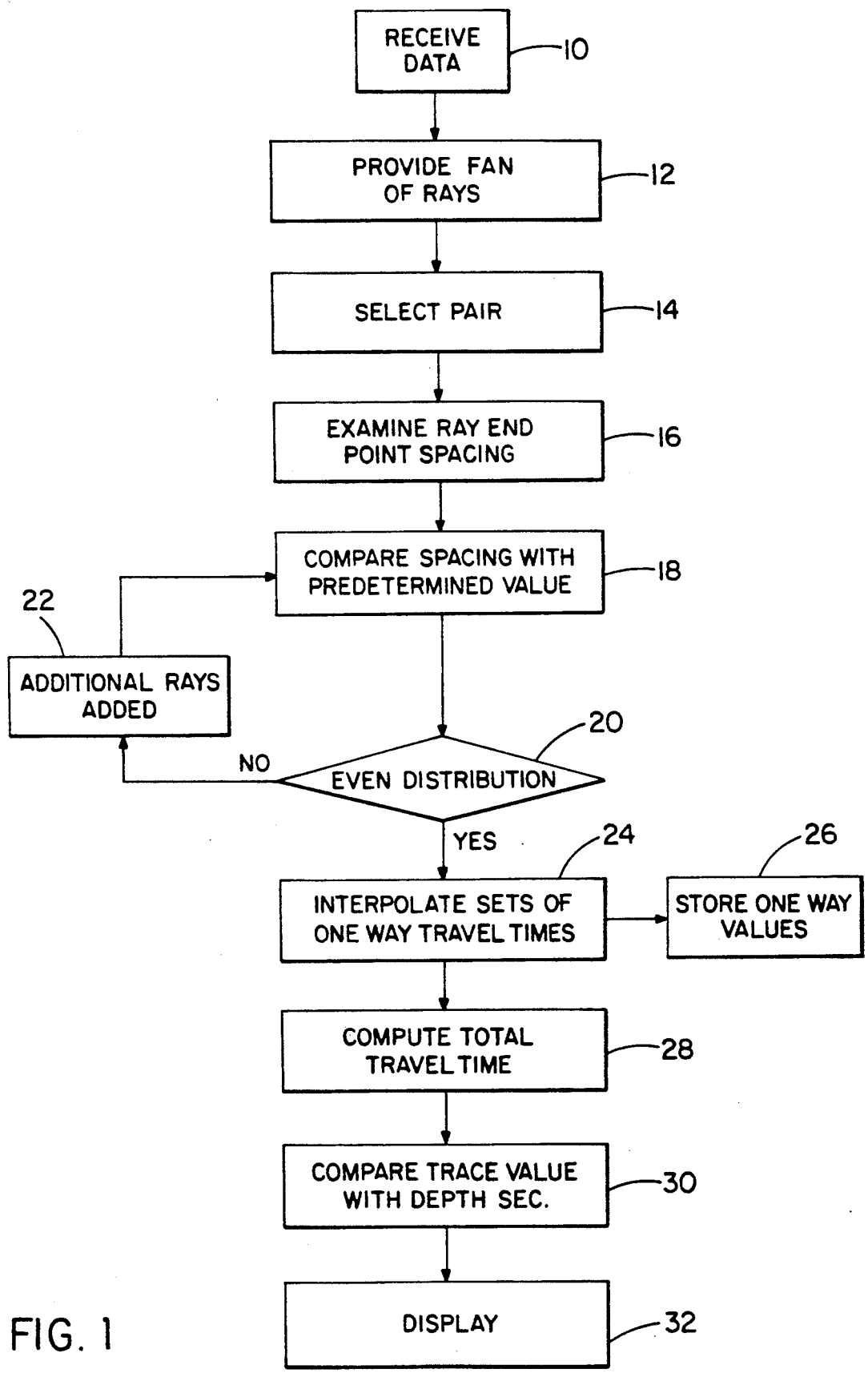
FIG. 1 is a flow chart of a method for determining travel times for seismic acoustic pulses.

The method of the present invention is shown in FIG. 1 wherein a flow chart is illustrated as including the following steps. Seismic data is received at step 10. From each surface point a fan of rays is provided at step 12 to all image points. This is done for each boundary layer from the surface down. At step 14, a pair of rays is selected. The ray end point spacing is examined at step 16. The spacing is compared with a predetermined maximum at step 18. Even distribution of the ray paths is checked at step 20. Additional rays may be added at step 22. From these data sets of one way travel times are interpolated at step 24. The one way travel times computed by this method may be stored at step 26 for future use. In storing these times, they may be scaled and converted to integer values to further reduce required storage space. The total travel time from one surface point, to an image point and back to another surface point is determined at step 28. The trace amplitude at this total travel time is combined with the depth section at the corresponding point at step 30. The new depth section is displayed at step 32.

At step 10, seismic data is received which includes source positions, receiver positions and seismic traces plotted against time. The data may also include time maps along with model information and velocity information.

In order to compute a travel time $T_A(X_i, Z_j)$ from a point A on the surface, such as the source or receiver, to an image point the following procedure is included. One way travel times for both source and receiver sets are generated by the same procedure. First, a fan of rays is shot from the surface position (either source or receiver) to the imaging points using a constant ray angle spacing as specified in step 12. Because of ray bending, the distribution of rays over the image points will not be even. Additional rays are added to fill in regions of low ray density among the image points. This procedure of adding rays is repeated until the total ray set is evenly distributed over the image points.

Figure 2:
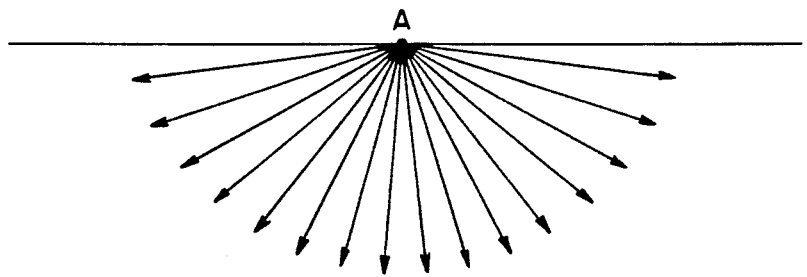
FIG. 2 is an illustration of a plurality of rays traveling from a point on the surface at predetermined angle increments.
Figure 3:
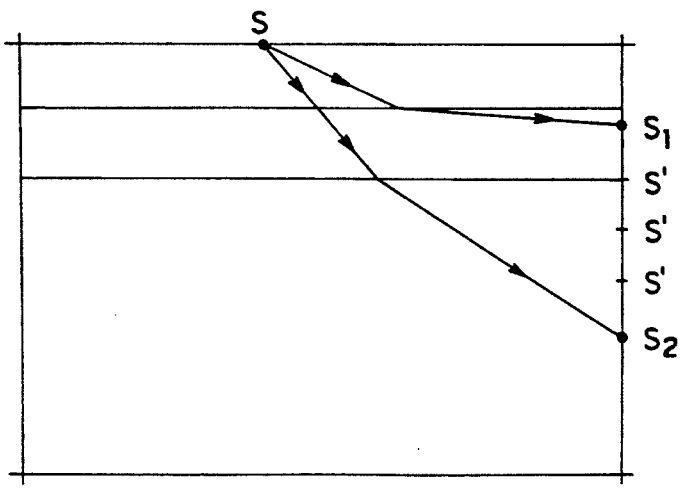
FIG. 3 is an illustration of a situation where rays must be added to provide an even distribution of reflection points.

In providing a fan of rays from point A, for example, fifty rays may be shot at equal increments of initial ray angle such as that illustrated in FIG. 2. These increments cover, for example, $(0,\pi)$. From the top of the list down, pairs of rays are selected at step 14. Each pair is examined and the distance between their end points is determined in step 16 as illustrated in FIG. 3. These rays are stored according to their initial angles in a double linked list. This storage scheme solves the problem of making room for new rays or removing unused rays from the ray set. Adding or deleting rays does not require shifting of other rays using this double linked list.

A double linked list is a linked list which can be followed in both forward and reverse direction. In Fortran, the rows of a table (for example, each row consists of data for one ray) are linked by two column arrays, FRD (forward pointer) and BCK (reverse pointer).

The advantage of using a linked list is that all the ray data stay in the same place, only the pointers FRD, BCK and START, END, AVAIL, etc. are changed. Saving in computer time is substantial for maintaining a list of 100–200 rays. In addition, START : 1st ray in the list
END : last ray in the list
AVAIL : next empty row to use for a new ray.
The whole table is divided into two linked lists. The first list, the ray list, goes from START ... END. This list contains all the rays. The second list, the available location list, goes from AVAIL ... This a list contains all unused rows.

The distance determined at step 16 is compared with a predetermined value and the number of rays necessary to provide an equal distribution is computed at step 18. This is done several times so that a group of rays is obtained that distributes over the image points uniformly.

The distribution of the rays which have thus far been provided is evaluated at decision block 20. If the distribution is uneven, the program returns to step 18 via step 22 where additional rays are added. If the distribution is even, the program proceeds to step 24.

Figure 4:
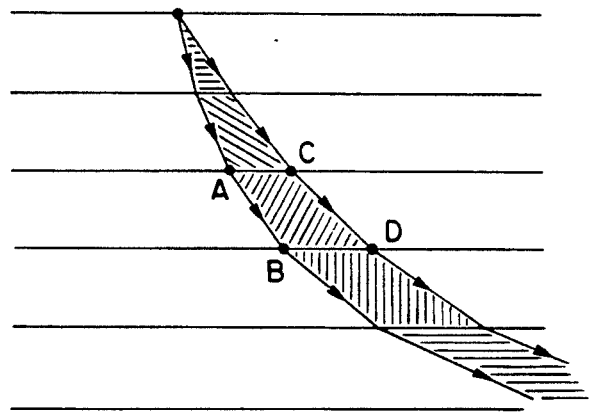
FIG. 4 is an illustration of two rays traveling downward from the surface.

If the distance between two consecutive end points is greater than a predetermined maximum, the number of rays needed to fill the gap is recorded. The spacing between ray $S_1$ and $S_2$ is illustrated in FIG. 3. Three points S, are illustrated as being necessary to provide equal ray distribution. At step 22 three additional rays are shot between $S_1$ and $S_2$ to fill this gap as illustrated in FIG. 4.

Next, at step 24 the travel time from a source is computed to all image points on a reflector surface. At step 24, $T_S(X_i,Z_j)$, the travel time from S to all the image points $(X_i,Z_j)$ and $T_R(X_i,Z_j)$, the travel time from R to all the image points is computed, where $i = 1 \ldots n$; and $j = 1 \ldots m$.

For every layer of the model the rays pass through, a pair of ray segments, such as AB and CD of FIG. 3, are interpolated to all the image points between them. For example, the area bounded by the interfaces AC and BD contain numerous image points in the shaded area.

Figure 5:
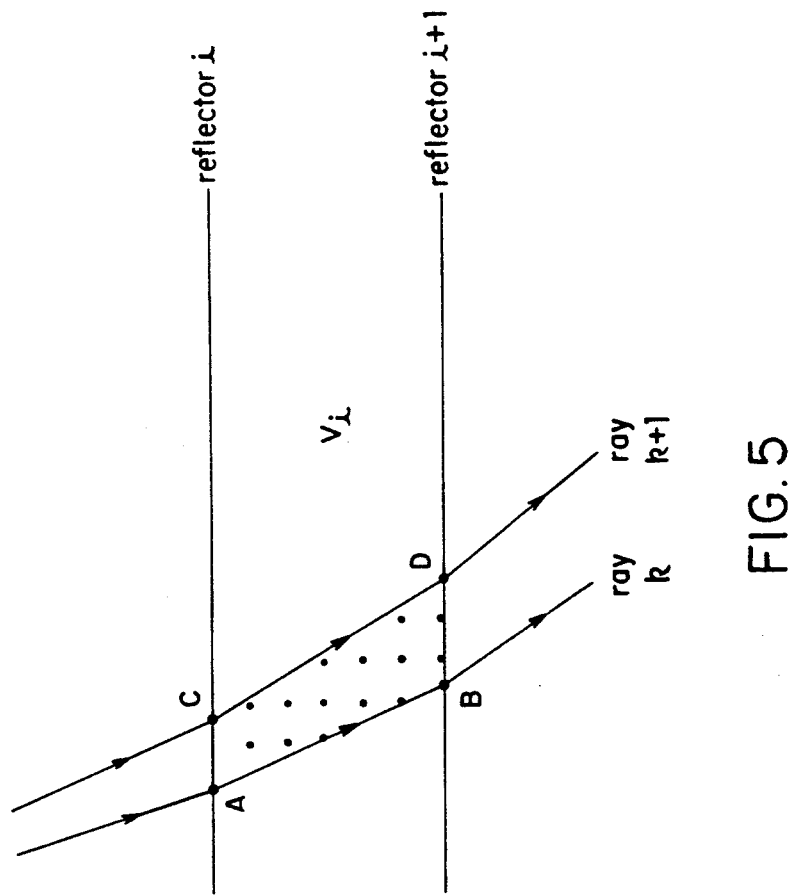
FIG. 5 is an illustration of two ray paths traveling through two reflectors.

Referring now to FIG. 5, image points in addition to those occurring at a reflector or density interface are illustrated as dots. These dots designate the image points where travel times are needed. At the dots, the travel time is computed by interpolating the two rays K, K+1; using A,B from ray K and C, D from ray K+1. Each point has an x, z and t associated with it, where x is horizontal coordinate, z is depth and t is the travel time along the ray from its source.

Figure 6:
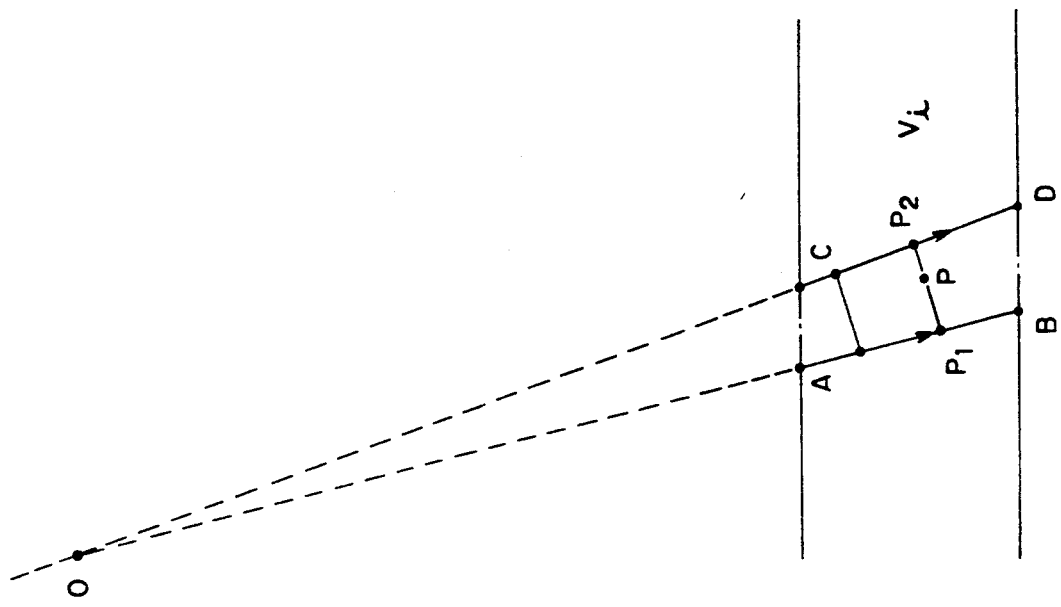
FIG. 6 is an illustration of two partial ray paths and the location of their origin.

Method of interpolating time t at various depth points to provide even data distribution is illustrated in FIG. 6. To find the travel time at P, it is noted from the propagation of sound waves that the travel time to P is the same as any other point, such as $P_1$ or $P_2$, which lies on the same "wavefront". For a layer with propagation velocity $V_1$, all points lie on a circle whose center 0 is of equal distance to $P_1$, P and $P_2$. The point 0 can be found by extending AB, CD until they intersect.

Then, 0 can be determined as $$t_o = t_a - \frac{OA}{V_1}$$

where OA=distance from 0 to A; and $$t_{p1} = t_p = t_{p2} = t_o + \frac{OP_1}{V_1}$$

Travel times from a surface position to all image points are computed as described above using the ray sets. Image points are evenly distributed in depth. Interpolation starts from the earliest imaging depth and ends at the latest imaging depth. Pairs of adjacent rays are used in the interpolation. One-way travel time is set to the maximum travel time for regions where the ray sets do not reach.

No assumptions are made concerning the inclination (dip or strike) of the subsurface formation or the location of the image point with respect to the source and receiver. These factors are compensated for by adding the input trace for the various image points to the model depth section. These factors add coherently only when a correct reflection point has been used. Thus, if the image point is not one from which a seismic wave incident from the selected source would have reflected to the selected receiver, the input trace will not add coherently to the depth section.

The one way travel times computed by the method of the present invention may be stored for future use at step 26. Disk storage space is reduced by scaling and converting the one-way travel times to integers. This provides an accuracy of about 0.000125 seconds. Integer values are packed contiguously into memory.

At step 28, the total travel time $T_{total}(X_i,Z_j)$ is computed by using the one way travel times from S to an image point and from R to an image point computed in steps 12–22.

$$T_{total}(X_i,Z_j) = T_S(X_i,Z_j) + T_R(X_i,Z_j)$$

The result is a two-way travel time set for a particular source and receiver combination for all imaging points. This set is used to map the seismic trace associated with the source-receiver combination from time to depth. This method of computing two way travel times results in a depth migration algorithm without dip limitations.

At step 30, the amplitude value of the seismic trace at the reflection point $(X_i, Z_j)$ for which the total travel time is to be computed, $A(T_{total}(X_i, Z_j))$ is added to $D(X_i, Z_j)$, the depth section at point $(X_i, Z_j)$. After all the input seismic traces are migrated, the final D is the migrated depth section. This depth section may then be displayed at step 30. If the input seismic traces are pre-stacked traces, D is the pre-stacked depth section; if the traces are traces after stacking, D is the stacked depth section.

Data order will effect the processing time, since the one way travel time sets are stored on disk for future use. At the beginning of the migration process, all travel time tables must be computed. Therefore, there is little impact from using saved travel time tables. Once a gather (e.g., shot, receiver, offset, etc.) of traces is input, previously computed travel time sets can be re-used. The depth migration is most efficient when the data are sorted into shot gathers (all receivers for one shot location). In this case the one way travel time set for the shot position can be maintained in memory and discarded when a new shot gather is input. Thus the source travel time sets never need to be stored on disk. Other orderings are less efficient because they require that both source and receiver travel time sets be stored in memory or on a disc.

Figure 7:
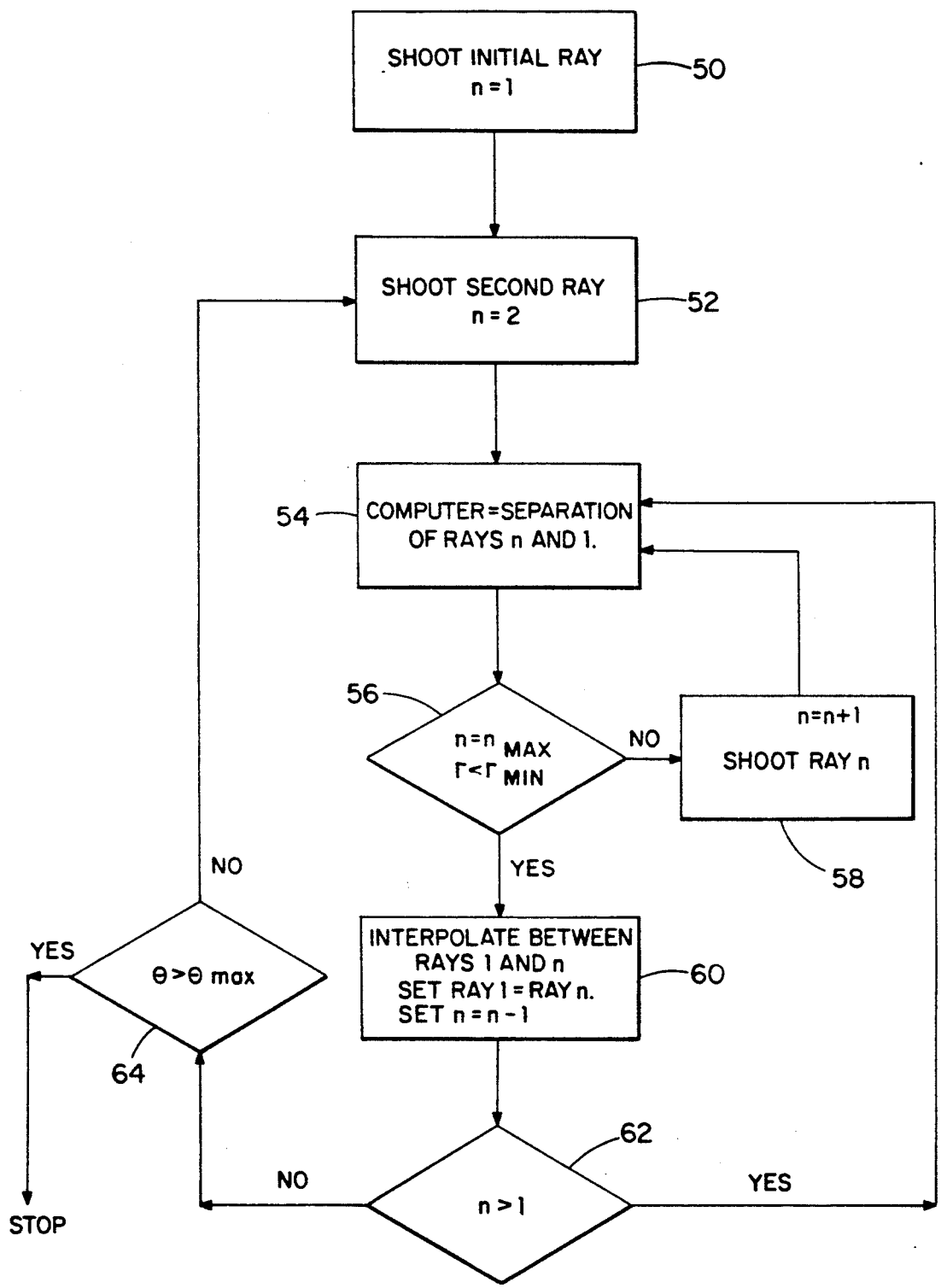
FIG. 7 is a flow chart of an alternate method for providing a fan of rays in the method of FIG. 1.

An alternate method for providing a fan of rays as set forth in block 12 of FIG. 1 is illustrated in FIG. 7.

At step 50, an initial ray is shot at the absolute smallest shooting angle $\theta_{min}$. This ray is labeled ray 1 whose shooting angle is $\theta_i$. Shooting angles are measured from the right horizontal axis. The number of rays in storage is called n and at this point n=1. At step 50, n='1. If step 52 is entered from step 50, this ray is the very first ray shot. If Step 52 is entered from subsequent steps, a portion of the travel time table has been filled and other rays have been removed from storage. In either case $\theta_1$ is the smallest shooting angle seen in the remaining process.

At step 52 a second ray is shot at angle $\theta_2 = \theta_1 + \Delta_\theta$, where $\Delta_\theta$ is a preset angular increment. This ray is labeled ray 2 and now n=2. At this point there are now n rays in storage. If Step 54 is entered from step 52, n=2. If step 54 is entered from either one of two subsequent steps, n may be 2, 3, ... $n_{max}$, where $n_{max}$ is a preset maximum number of rays to be held in storage. The rays are labeled 1, 2, 3, ..., n−1, n, in the order in which they were shot. Ray 1 has the smallest angle, ray 2 has the largest angle, ray 3 is half way between 1 and 2, ray 4 is half way between rays 1 and 3, and ray n is half way between rays 1 and n−1.

At step 54, the spatial distance separating the ray 1 and ray n at a time distance of $t_{max}$ from the ray origin is measured. This distance is called $r_{ln}$. At step 56 both n and r are evaluated. If $r_{ln}$ is greater than a preset threshold separation, called $r_{min}$, a new ray is provided between ray 1 and ray n at an angle $\theta = (\theta_1 + \theta_n) / 2$ at step 58. This value of n is increased by 1 and the new ray becomes ray n. Otherwise the process continues to Step 60. If n is equal to a preset maximum number of rays to be saved in storage called $n_{max}$ the process continues to step 60. Otherwise the process returns to Step 54 through step 58.

At step 60 the distance between rays n and 1 is smaller than $r_{min}$ or n is equal to $n_{max}$. The travel times for the points between rays 1 and n are determined and the travel time table is completed for the rays present. Ray 1 is deleted storage and this space becomes available for future use by new rays. Ray n takes its place as the ray with the smallest shooting angle and is called the new ray 1. The value of n is by 1.

At step 62, the value of n is checked. If n is greater than 1 the process returns to Step 54. If not, the moves to step 64.

At step 64 the angle $\theta$ is compared to $\theta_{max}$. If the angle of ray 1 is greater than the preset maximum angle to shoot in the procedure the process ends. If the angle of ray 1 is less than the preset maximum shooting angle the process returns to Step 52. This procedure is repeated until the entire travel time table has been filled in. The maximum number of rays which must be saved is quite small ($n_{max}$=3 to 5) since the smallest angular separation obtainable with this scheme is equal to:

$$\Delta_\theta / (2^{(n_{max}-1)}).$$

The present invention provides a method for determining two way travel times for any source and receiver pair. If the seismic traces are pre-stack, the depth section is a pre-stack depth section. If the seismic traces have been stacked, the depth section is a stacked depth section. Thus, the present invention can be used with seismic data whether it has been gathered and stacked or whether it is raw data.

The present invention has been described by way of a preferred embodiment. However, this description has been provided for illustration purposes and the present invention should not be limited thereto, but only by the scope of the following claims.

What is claimed is:

1. A method for depth migrating ray traces before stacking comprising the steps of:

receiving raw seismic data signals representing acoustic waves generated by a plurality of sources and detected by a plurality of receivers, each of said sources and said receivers having a surface position;

generating a set of one way travel times for each surface position to all image points;

storing said one way travel times;

identifying a set of one way travel times from one source surface position to each of said image points;

identifying a second set of one way travel times from one receiver surface position to each of said image points;

calculating a two way travel time set to said image points by summing said set of one way travel times for said one source surface position and said second set of one way travel times for said one receiver surface position to each of said image points;

mapping a seismic trace associated with a source and receiver combination represented by said two way travel time set; and displaying said map of said seismic trace associated with said source and receiver combination.

2. The method according to claim 1 also including the steps of:

scaling said one way travel times; and converting said scaled travel times to integer values.

3. The method according to claim 1 wherein sa generating step includes the steps of:

shooting a fan of rays from each surface selecting a pair of rays; and interpolating a ray path to all image points between said pair of rays.

4. The method according to claim 3 wherein said interpolating step includes the steps of:
 examining each pair of rays;
 computing a distance between end points of each ray of said pair of rays; and
 determining a number of rays required to provide a group of rays having predetermined spacing.

5. The method according to claim 4 wherein said determining step includes the step of:
 providing rays spaced apart by a angle increment.

6. The method to claim 5 wherein said step includes:
 providing a pre-determined number of rays at equal increments of initial ray angle;
 computing the distance between the end points of said pre-determined number of rays;
 comparing said distance against a pre-determined value; and
 computing the number of rays necessary to provide an equal distribution.

7. The method according to claim 6 wherein said providing step, said comparing step, said determining step, and said calculating step are repeated a plurality of times to obtain a group of rays that distributes over the image points uniformly.

8. A method for depth migrating ray traces before stacking comprising the steps of:
 receiving ray seismic data representing acoustic waves generated by a plurality of sources and detected by a plurality of receivers;
 generating one way travel times for each surface position to all image points;
 storing said one way travel times;
 identifying a first one way travel time from one source position to an image point;
 identifying a second one way travel time from another receiver position to said image point;
 calculating a two way travel time by summing said first one way travel time and said second one way travel time;
 mapping a seismic trace associated with a source/receiver combination represented by said two way travel time; and
 displaying said map of said seismic trace associated with said source/receiver combination.

9. The method according to claim 8 wherein said identifying a first one way travel time step includes the steps of:
 providing a fan of rays from said source to a plurality of image points;
 selecting a pair of rays from said fan of rays;
 interpolating times to image points between the image points defined by said pair of rays; and
 storing said interpolated times.

* * * * *

UNITED STATES PATENT AND TRADEMARK OFFICE
CERTIFICATE OF CORRECTION

PATENT NO. : 5,229,938

DATED : July 20, 1993

INVENTOR(S) : Shein-Shion Wang, John B. Sinton, and Douglas W. Hanson

It is certified that error appears in the above-identified patent and that said Letters Patent is hereby corrected as shown below:

Column 5, line 68, the word "from" should have followed the word "deleted".

Column 6, line 3, the word "decreased" should have followed the word "is".

Column 6, line 65, the word "position;" should have followed the word "surface".

Signed and Sealed this

Fifth Day of April, 1994

Attest:

BRUCE LEHMAN

Attesting Officer     Commissioner of Patents and Trademarks